(12) United States Patent
Okumura

(10) Patent No.: US 8,816,525 B2
(45) Date of Patent: Aug. 26, 2014

(54) ELECTRIC POWER SUPPLY DEVICE FOR SLIDING DOOR

(75) Inventor: Masahiro Okumura, Shiga (JP)

(73) Assignees: Furukawa Electric Co., Ltd, Tokyo (JP); Furukawa Automotive Systems Inc., Shiga (JP)

( * ) Notice: Subject to any disclaimer, the term of this patent is extended or adjusted under 35 U.S.C. 154(b) by 0 days.

(21) Appl. No.: 13/812,139

(22) PCT Filed: Nov. 1, 2011

(86) PCT No.: PCT/JP2011/006118
§ 371 (c)(1),
(2), (4) Date: Jan. 24, 2013

(87) PCT Pub. No.: WO2012/060094
PCT Pub. Date: May 10, 2012

(65) Prior Publication Data
US 2013/0214099 A1  Aug. 22, 2013

(30) Foreign Application Priority Data
Nov. 2, 2010  (JP) ................. 2010-246616

(51) Int. Cl.
*H02G 1/00* (2006.01)
*F16L 3/015* (2006.01)
*B60R 16/027* (2006.01)
*H02G 11/00* (2006.01)
*H02G 3/00* (2006.01)
*H02G 3/04* (2006.01)

(52) U.S. Cl.
CPC . *F16L 3/015* (2013.01); *H02G 3/26* (2013.01);
*H02G 3/0462* (2013.01); *B60R 16/027* (2013.01); *H02G 11/00* (2013.01)
USPC ............................................ 307/10.1; 248/65

(58) Field of Classification Search
USPC ......... 248/65, 68.1, 74.1, 74.2, 73; 174/72 A, 174/68.1, 68.3; 307/9.1, 10.1
See application file for complete search history.

(56) References Cited

U.S. PATENT DOCUMENTS 7,375,281 B2 * 5/2008 Kogure et al. ............... 174/72 A
7,390,968 B2 * 6/2008 Kogure et al. ............... 174/72 A
(Continued)

FOREIGN PATENT DOCUMENTS

JP  3954802 B2  12/2001
JP  3850758 B2   1/2004
(Continued)

*Primary Examiner* — Steven Marsh
(74) *Attorney, Agent, or Firm* — Amin, Turocy & Watson, LLP

(57) ABSTRACT

A power supply apparatus (30) for sliding door includes a flat cable (4), a vehicle body side attachment (1) that supports the flat cable (4) in the vehicle body (19) side, and a door side attachment (2) that supports the flat cable (4) in the sliding door (20) side. The vehicle body side attachment (1) supports the flat cable (4) such that a longitudinal direction of the flat cable (4) has a predetermined first inclination angle relative to a horizontal plane. The door side attachment (2) supports the flat cable (4) such that the longitudinal direction of the flat cable (4) has a predetermined second inclination angle relative to the horizontal plane. The vehicle body side attachment (1) and the door side attachment (2) support the flat cable (4) such that a thickness direction of the flat cable (4) is substantially in parallel with the horizontal plane.

7 Claims, 9 Drawing Sheets

(56) References Cited

U.S. PATENT DOCUMENTS

| | | | |
|---|---|---|---|
| 7,669,367 B2 * | 3/2010 | Shimura et al. | 49/213 |
| 7,980,622 B2 * | 7/2011 | Noritsugu et al. | 296/155 |
| 8,196,351 B2 * | 6/2012 | Aoki et al. | 49/360 |
| 8,227,693 B2 * | 7/2012 | Katou et al. | 174/72 A |
| 8,237,053 B2 * | 8/2012 | Katou et al. | 174/72 A |
| 2010/0089642 A1 * | 4/2010 | Aoki et al. | 174/72 A |

FOREIGN PATENT DOCUMENTS

| | | |
|---|---|---|
| JP | 2008-143254 A | 6/2008 |
| JP | 2009-234386 A | 10/2009 |
| JP | 2010-74974 A | 4/2010 |

\* cited by examiner

ELECTRIC POWER SUPPLY DEVICE FOR SLIDING DOOR

CROSS-REFERENCE TO RELATED APPLICATIONS

The subject application is a US national stage application of PCT Application Serial No. PCT/JP2011/006118, filed Nov. 1, 2011, and entitled "ELECTRIC POWER SUPPLY DEVICE FOR SLIDING DOOR", which claims priority to Japanese Patent Application Serial No. 2010-246616, filed Nov. 2, 2010, the disclosures of which are incorporated herein by reference in their entirety.

TECHNICAL FIELD

The present invention mainly relates to a configuration of a power supply apparatus for sliding door that supplies power from the vehicle body side to the sliding door side.

BACKGROUND ART

In recent years, to improve the convenience, an increasing number of vehicles are provided with power sliding doors. The power sliding door is a mechanism for automatically opening and closing a sliding door, and includes many electrical and electronic parts such as a motor and an operation switch for achieving the mechanism, an entrapment detection sensor provided in consideration of the security for a passenger, and a control unit for controlling them. Many (or all) of the electrical and electronic parts associated with the power sliding door are mounted within the sliding door. In addition to the above-mentioned parts, many electrical and electronic parts such as a power window motor and a speaker are mounted in the sliding door.

The electrical and electronic parts mounted in the sliding door need to receive power supply from the vehicle body side and communicate various control signals with the vehicle body side. In this respect, a configuration has been conventionally known in which a terminal is provided in each of the sliding door side and the vehicle body side so that the terminals are brought into contact with each other when the sliding door is closed to thereby supply power from the vehicle body side to the sliding door side. In this configuration, however, power cannot be supplied to the above-mentioned electrical and electronic parts under a state where the sliding door is open. Therefore, this configuration cannot be adopted in a sliding door including a power sliding door mechanism.

Accordingly, a vehicle including the power sliding door mechanism adopts a power supply apparatus for sliding door, that electrically connects the vehicle body side to the sliding door side by means of a cable. Since the cable is flexibly deformable to some extent, a change of the positional relationship between the sliding door and the vehicle body caused by opening/closing of the sliding door can be responded to. Thus, such type of power supply apparatus for sliding door enables the electrical and electronic parts of the sliding door side to receive power supply from the vehicle body side and to communicate control signals with the vehicle body side irrespective of an open/closed state of the sliding door.

In the above-described power supply apparatus for sliding door, however, in a case where the cable connecting the sliding door side to the vehicle body side is completely freely deformable, a failure may occur because, for example, the deformed cable is brought into contact with and caught by the electrical and electronic parts or the cable vibrates to cause an abnormal noise. Therefore, for the above-described power supply apparatus for sliding door, various configurations have been proposed for restricting the deformation of the cable that connects the sliding door side to the vehicle body side.

For example, Patent Document 1 discloses a power supply apparatus for automobile sliding door, including a flexed portion protecting member that accommodates a flexed portion of a wiring harness, which is located in the middle with respect to the longitudinal direction thereof, in such a manner that the flexed portion is movable substantially in parallel with a sliding door. The flexed portion protecting member includes a first curved wall and a second curved wall. Patent Document 1 states that this configuration causes the flexed portion of the wiring harness to be pressed against the curved walls and therefore occurrence of a noise or a vibration due to backlash of the flexed portion is not caused.

Patent Document 2 discloses a cable routing support structure for sliding door, that is made up of a plurality of link members linearly coupled to one another and that includes a cable guide for guiding a cable. The cable guide is bent in accordance with a sliding movement of the sliding door, and arranged so as to extend toward the sliding door side. Patent Document 2 states that this can prevent any interference to other members in the vehicle main body side.

PRIOR-ART DOCUMENTS

Patent Documents

Patent Document 1: Japanese Patent No. 3954802
Patent Document 2: Japanese Patent No. 3850758

SUMMARY OF THE INVENTION

Problems to be Solved by the Invention

Meanwhile, in the existing sliding door, many electrical and electronic parts and devices are mounted. To facilitate the arrangement (layout) of them, downsizing of each of the structures thereof is demanded. Along with the downsizing, weight reduction is also being demanded from the viewpoint of improvement in the environmental performance. Needless to say, the downsizing and weight reduction of the power supply apparatus for sliding door are also strictly demanded.

Besides, it is also demanded that the power supply apparatus for sliding door is arranged such that, when the sliding door is fully closed, the power supply apparatus is covered with a door trim, which is an article to the design, and thus becomes invisible and untouchable from the interior of the vehicle. This is because the power supply apparatus for sliding door that is visible may deteriorate the aesthetic appeal and the power supply apparatus for sliding door that is touchable may impair the security for the passenger or may cause a risk of damaging or breaking the power supply apparatus for sliding door. On the other hand, it is demanded that, when the sliding door is fully open, the power supply apparatus for sliding door is not exposed near the feet of the passenger. This is for eliminating the possibility that the passenger may stumble over the power supply apparatus for sliding door when he/she gets on and off the vehicle. As described above, various demands have been imposed on the power supply apparatus for sliding door.

In this point, in Patent Document 1, the flexed portion protecting member is formed as small as possible in consideration of a range of movement of the flexed portion of the wiring harness. However, since the flexed portion is inevitably moved along with the opening/closing of the sliding door, there is a limit to downsizing of the flexed portion protecting member. Therefore, in the structure of the power supply apparatus for automobile sliding door disclosed in Patent Document 1, there is a difficulty in achieving the downsizing and weight reduction.

In the cable routing support structure for sliding door disclosed in Patent Document 2, a bending operation of the cable is performed in a horizontal plane. Accordingly, in the configuration of Patent Document 2, unlike in the configuration of Patent Document 1, the cable routing support structure cannot be accommodated in an inner panel of the sliding door. Therefore, in the configuration of Patent Document 2, the cable routing support structure is exposed to the outside. This causes a bad appearance and also causes the possibility that the passenger may touch the cable routing support structure. Moreover, since the cable routing support structure disclosed in Patent Document 2 is made up of many link members coupled to one another, there is a limit to weight reduction thereof.

As described above, in the conventional techniques disclosed in Patent Documents 1 and 2, it would be impossible to satisfy all the demands imposed on the power supply apparatus for sliding door.

The present invention is made under the circumstances described above, and a primary object of the present invention is to provide a power supply apparatus for sliding door capable of downsizing and weight reduction.

Means for Solving the Problems and Effects Thereof

The problem to be solved by the present invention is as described above. Next, means for solving the problem and effects thereof will be described.

In an aspect of the present invention, a power supply apparatus for sliding door configured to electrically connect a vehicle body side to a sliding door side is provided. The power supply apparatus for sliding door is configured as follows. The power supply apparatus for sliding door includes a flat cable, a vehicle body side attachment that supports the flat cable in the vehicle body side, and a door side attachment that supports the flat cable in the sliding door side. The vehicle body side attachment supports the flat cable such that a longitudinal direction of the flat cable has a predetermined first inclination angle relative to a horizontal plane. The door side attachment supports the flat cable such that the longitudinal direction of the flat cable has a predetermined second inclination angle relative to the horizontal plane. The vehicle body side attachment and the door side attachment support the flat cable such that a thickness direction of the flat cable is substantially in parallel with the horizontal plane.

That is, since there is an anisotropy in the bendability of the flat cable, the flat cable is, when deformed, likely to bend in a predetermined direction. Accordingly, by connecting the vehicle body side and the sliding door side to each other by means of the flat cable, the deformation of the flat cable caused when the sliding door slides can be three-dimensionally controlled. As a result, a guide, or the like, for restricting the deformation of the cable, which has been provided in the conventional techniques, can be omitted. Thus, the downsizing and weight reduction of the power supply apparatus for sliding door are achieved.

The power supply apparatus for sliding door mentioned above is preferably configured as follows. The first inclination angle and the second inclination angle are determined such that at least a part of the flat cable is suspended vertically downward at a location between the vehicle body side attachment and the door side attachment.

This can prevent the flat cable from interfering with the sliding door and interior parts of the sliding door during opening/closing of the sliding door.

In the power supply apparatus for sliding door mentioned above, it is preferable that the flat cable is routed such that the flat cable is tighter when the sliding door is fully open or fully closed than when the sliding door is half open.

When the sliding door is fully closed, the suspended part of the flat cable is stretched into a substantially linear shape. Therefore, the flat cable can be efficiently covered with an interior part of the sliding door. This prevents deterioration in the aesthetic appeal, because the flat cable is not exposed when the sliding door is fully closed. Also when the sliding door is fully open, the suspended part of the flat cable is stretched into a substantially linear shape. Therefore, the trajectory of the flat cable is not largely curved. This can ensure a space near the feet of the passenger when the passenger gets on and off the vehicle, and thus can reduce a risk that the passenger may stumble.

In the power supply apparatus for sliding door mentioned above, it is preferable that the first inclination angle is 0° or more and 60° or less, and the second inclination angle is 30° or more and 90° or less.

Setting the first inclination angle and the second inclination angle to values in these ranges can achieve an appropriate suspended attitude of the flat cable.

The power supply apparatus for sliding door mentioned above is preferably configured as follows. The vehicle body side attachment supports the flat cable such that, in a plan view, the longitudinal direction of the flat cable has a predetermined third inclination angle relative to a lateral direction of the vehicle body. The third inclination angle is determined such that a direction in which the flat cable extends out from the vehicle body side attachment is oriented obliquely rearward of the vehicle body.

This can suppress a rapid change of the trajectory of the flat cable during opening/closing of the sliding door, and can stabilize the trajectory of the flat cable.

In the power supply apparatus for sliding door mentioned above, it is preferable that the third inclination angle is 0° or more and 60° or less.

Setting the third inclination angle to a value in this range can stabilize the trajectory of the flat cable during opening/closing of the sliding door.

In the power supply apparatus for sliding door mentioned above, it is preferable that the flat cable is protected with an outer covering having excellent bending properties.

This can not only protect the flat cable but also improve the aesthetic appeal of the flat cable when the sliding door is half open or fully open.

EMBODIMENT FOR CARRYING OUT THE INVENTION

Next, an embodiment of the present invention will be described with reference to the drawings.

Figure 1:
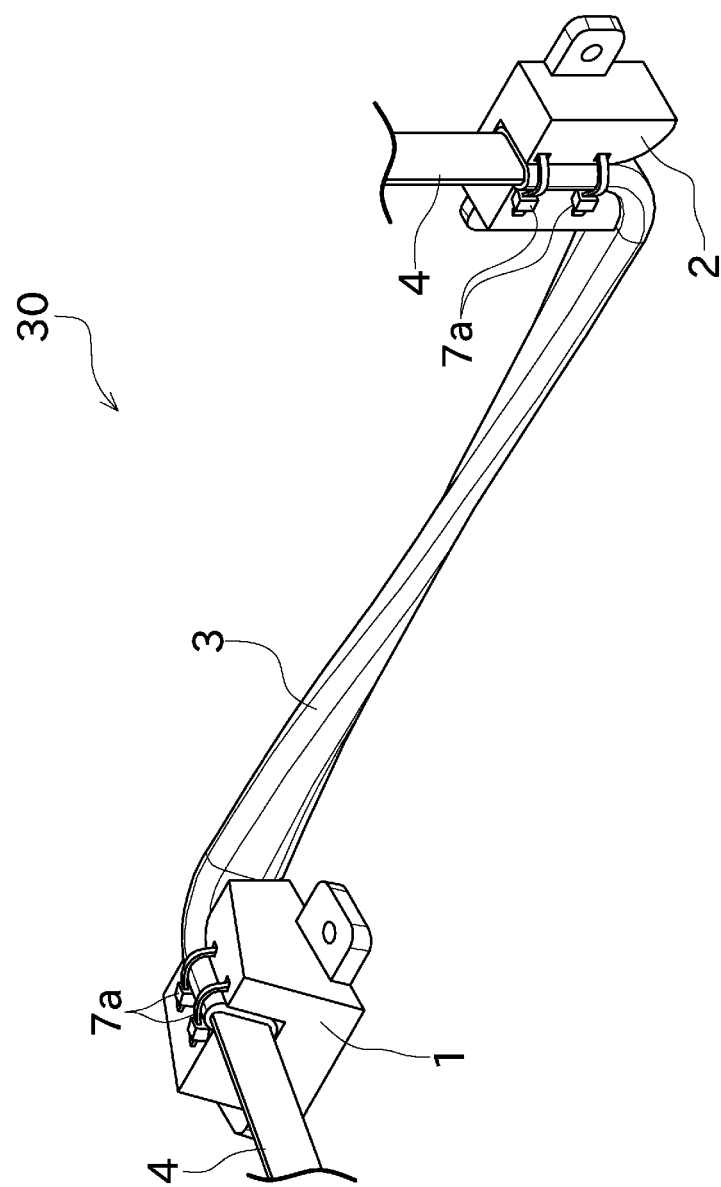
FIG. 1 A perspective view of a power supply apparatus for sliding door according to an embodiment of the present invention.
Figure 2:
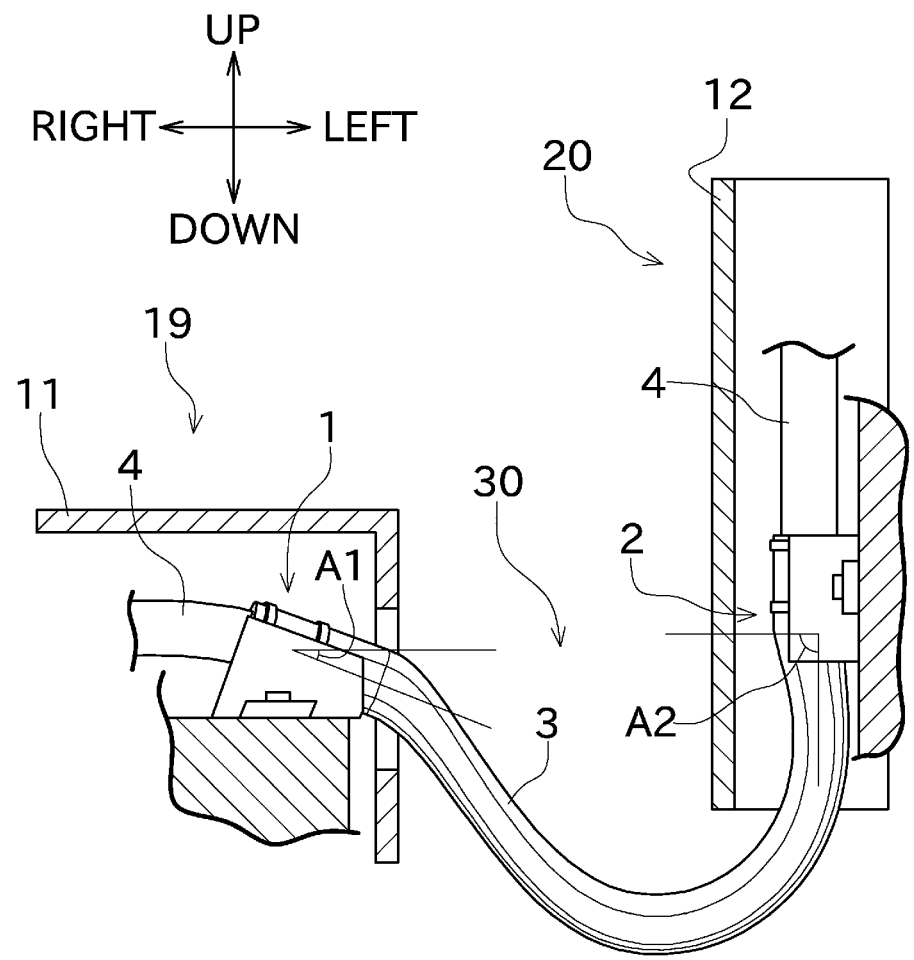
FIG. 2 A front elevational view of the power supply apparatus for sliding door.

As shown in FIG. 1, a power supply apparatus 30 for sliding door according to an embodiment of this embodiment includes a vehicle body side attachment 1, a door side attachment 2, a flat cable 4, and an outer covering 3. As shown in FIG. 2, the flat cable 4 is arranged so as to extend between a vehicle body 19 and a sliding door 20. The power supply apparatus 30 for sliding door is for electrically connecting the vehicle body 19 side and the sliding door 20 side to each other in a vehicle including the vehicle body 19 and the sliding door 20 that is slidable relative to the vehicle body 19.

The flat cable 4 has a known configuration in which a plurality of thin cables are arranged and bundled into a planar shape. A direction in which the thin cables are arranged will be referred to as a width direction of the flat cable 4. A direction perpendicular to the width direction and a longitudinal direction of the cable is referred to as a thickness direction of the flat cable 4. At both ends of the flat cable 4, coupling connectors (not shown) are arranged. The coupling connector provided at one end of the flat cable 4 is connected to various electrical and electronic parts arranged in the sliding door 20 side, and the coupling connector provided at the other end of the flat cable 4 is connected to a battery, a control device, and the like, arranged in the vehicle body 19 side. Thereby, the electrical and electronic parts (not shown) arranged in the sliding door 20 can receive power supply from the vehicle body 19 side and can communicate control signals with the vehicle body 19 side.

Figure 3:
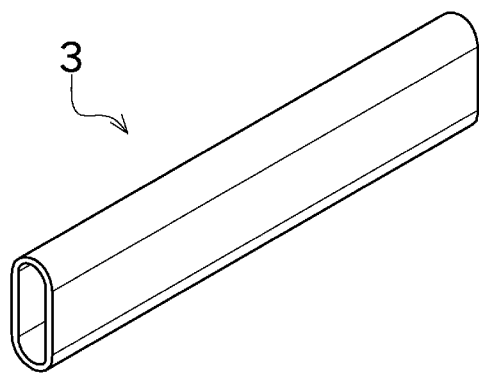
FIG. 3 A perspective view of an outer covering.

The outer covering 3 having a tube-like shape as shown in FIG. 3 is arranged between the vehicle body side attachment 1 and the door side attachment 2. The flat cable 4 is passed through the outer covering 3. Thus, the outer covering 3 protects the flat cable 4 located between the vehicle body side attachment 1 and the door side attachment 2. Since the flat cable 4 is not directly exposed, the aesthetic appeal of the power supply apparatus 30 for sliding door is improved. The outer covering 3 is configured with excellent bending properties and excellent flexibility (for example, configured of a rubber tube). The outer covering 3 is configured in accordance with the shape of the flat cable 4, such that a cross sectional shape of the outer covering 3 as sectioned in a plane perpendicular to the longitudinal direction thereof is a flat shape.

The flat cable 4 is supported on the vehicle body side attachment 1 and the door side attachment 2. As shown in FIG. 2, the vehicle body side attachment 1 is attached to the vehicle body 19 side, and the door side attachment 2 is attached to the sliding door 20 side. The vehicle body side attachment 1 is arranged below a scuff plate 11 that is an interior part of the vehicle body 19 side. On the other hand, the door side attachment 2 is arranged outside a door trim 12 that is an interior part of the sliding door. Thereby, the vehicle body side attachment 1 and the door side attachment 2 are not exposed to the interior of the vehicle. In this embodiment, the vehicle body side attachment 1 and the door side attachment 2 are configured so as to support the outer covering 3 that covers the flat cable 4. To be exact, the vehicle body side attachment 1 and the door side attachment 2 are configured so as to indirectly support the flat cable 4 with interposition of the outer covering 3.

As well known, the sliding door 20 is slidable relative to the vehicle body 19, in a direction parallel to a horizontal plane (more specifically, in a front-back direction of the vehicle body 19). Therefore, when the sliding door 20 is opened/closed, the vehicle body side attachment 1 and the door side attachment 2 are moved relative to each other. The flat cable 4 and the outer covering 3 having flexibility can be deformed at a location between the vehicle body side attachment 1 and the door side attachment 2, even when the sliding door is opened/closed so that the positional relationship between the vehicle body side attachment 1 and the door side attachment 2 is changed as described above. As a result, irrespective of an opening/closing state of the sliding door, the electrical connection between the vehicle body side and the sliding door side is maintained.

Here, if the above-mentioned deformation of the cable is completely free, a problem may occur because, for example, the deformed cable is caught by electrical and electronic parts. Therefore, an innovation for controlling the deformation of the cable is required.

A cable adopted in a conventional power supply apparatus is an ordinary round cable. The round cable uniformly bends in any direction. Therefore, it is necessary to separately provide some configuration for controlling the deformation thereof. For this purpose, the conventional power supply apparatus is provided with a guide that restricts a movement of the cable. However, this type of guide, or the like, increases the size of the power supply apparatus, and makes weight reduction difficult.

In this respect, as described above, the power supply apparatus 30 for sliding door according to this embodiment adopts the flat cable 4 as a cable that connects the vehicle body 19 side and the sliding door 20 side to each other. The flat cable 4 is likely to bend in a plane perpendicular to the width direction thereof, and not likely to bend in a plane parallel to the width direction. That is, there is an anisotropy in the bendability of the flat cable 4, unlike the round cable mentioned above. By making use of this property, the deformation of the flat cable 4 caused when the sliding door is opened/closed can be three-dimensionally controlled to some extent. As a result, a guide, or the like, provided in the conventional power supply apparatus can be omitted.

In the following, a more specific description will be given.

Figure 4:
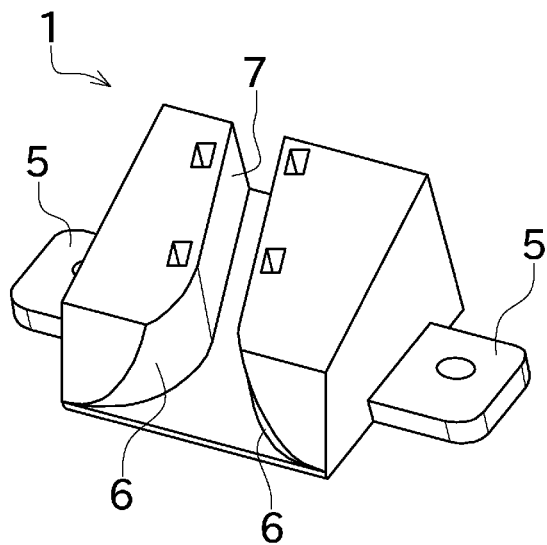
FIG. 4 A perspective view of a vehicle body side attachment.
Figure 5:
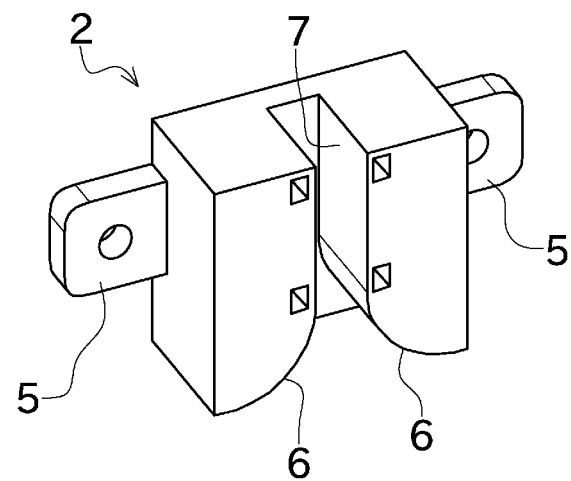
FIG. 5 A perspective view of a door side attachment.

Firstly, configurations of the vehicle body side attachment 1 and the door side attachment 2 that support the flat cable 4 will be described in detail. The vehicle body side attachment 1 and the door side attachment 2 are formed by a synthetic resin being injection-molded. As shown in FIGS. 4 and 5, each of the vehicle body side attachment 1 and the door side attachment 2 includes fixing bearing surfaces 5, a cable mounting groove 7, and protecting R portions 6.

The fixing bearing surface 5 has a bolt insertion hole through which a bolt is inserted for fixing the vehicle body side attachment 1 or the door side attachment 2 to the vehicle (the vehicle body 19 or the sliding door 20). The bolt is fastened to the fixing bearing surface 5, and thereby the vehicle body side attachment 1 and the door side attachment 2 are fixed to the vehicle.

The cable mounting groove 7 is a groove for securing the flat cable 4. In this embodiment, as described above, the vehicle body side attachment 1 and the door side attachment 2 are configured to support the outer covering 3 having the flat cable 4 contained therein. Accordingly, the cable mounting groove 7 is configured to secure the outer covering 3 having the flat cable 4 contained therein. More specifically, the width of the cable mounting groove 7 is substantially coincident with the thickness of the outer covering 3. The outer covering 3 is placed in the cable mounting grooves 7, and thereby the outer covering 3 (and the flat cable 4 contained in the outer covering 3) can be secured. Then, the outer covering 3 placed in the cable mounting grooves 7 is fixed with binding bands 7a, as shown in FIG. 1. As a result, the outer covering 3 (and the flat cable 4) is surely fixed to the vehicle body side attachment 1 and the door side attachment 2.

The protecting round portion 6 is a portion provided at the end of the cable mounting groove 7, in which a side wall surface of the cable mounting groove 7 is shaped into a smooth round shape. This can protect the outer covering 3 (and the flat cable 4) extending out from the cable mounting groove 7 such that the outer covering 3 (and the flat cable 4) does not bend at a predetermined bend radius or less. The curvature of the protecting round portion 6 is a curvature that allows the flat cable 4 to endure even though the sliding door is opened/closed several tens of thousands of times.

Next, a situation where the vehicle body side attachment 1 and the door side attachment 2 support the flat cable 4 (and the outer covering 3) will be described in detail.

As described above, there is an anisotropy in the bendability of the flat cable 4. There is also an anisotropy in the bendability of the outer covering 3 that is formed with a flat cross section following the shape of the flat cable 4. Accordingly, since the vehicle body side attachment 1 and the door side attachment 2 support the flat cable 4 such that the flat cable 4 is likely to bend in a desired direction while the flat cable 4 is not likely to bend in an undesired direction, the deformation of the flat cable 4 can be caused with a desired trajectory.

Here, the sliding door 20 slides in the direction parallel to the horizontal plane (more specifically, in the front-back direction of the vehicle body). Therefore, making the flat cable 4 (and the outer covering 3) likely to bend in a plane parallel to the horizontal plane is preferable, because it allows the flat cable 4 to readily follow the opening/closing of the sliding door 20. Accordingly, in this embodiment, the cable mounting grooves 7 of the vehicle body side attachment 1 and the door side attachment 2 are formed such that the thickness direction of the flat cable 4 (and the outer covering 3) placed in the cable mounting grooves 7 is in parallel with the horizontal plane. As a result, at locations near the vehicle body side attachment 1 and the door side attachment 2, the outer covering 3 and the flat cable 4 can be readily deformed in accordance with the opening/closing of the sliding door 20.

On the other hand, in this embodiment, as shown in FIG. 2, the flat cable 4 (and the outer covering 3) located between the vehicle body side attachment 1 and the door side attachment 2 is routed so as to extend below the door trim (an interior part pf the sliding door) 12. Therefore, in this embodiment, the cable mounting grooves 7 of the vehicle body side attachment 1 and the door side attachment 2 are formed such that the flat cable 4 placed in the cable mounting grooves 7 is suspended vertically downward.

To be specific, the cable mounting groove 7 of the vehicle body side attachment 1 is formed such that the longitudinal direction of the flat cable 4 (and the outer covering 3) placed in the cable mounting groove 7 has a predetermined first inclination angle A1 relative to the horizontal plane. This makes the flat cable 4 (and the outer covering 3) extend obliquely downward out from the vehicle body side attachment 1 and then extend toward the door side attachment 2. On the other hand, the cable mounting groove 7 of the door side attachment 2 is formed such that the longitudinal direction of the flat cable 4 (and the outer covering 3) placed in the cable mounting groove 7 has a predetermined second inclination angle A2 relative to the horizontal plane. This makes the flat cable 4 (and the outer covering 3) extend downward out from the door side attachment 2 and then extend toward the vehicle body side attachment 1.

In the above-described configuration, the flat cable 4 (and the outer covering 3) located between the vehicle body side attachment 1 and the door side attachment 2 is deformed so as to be suspended vertically downward. This can prevent the flat cable 4 (and the outer covering 3) from being in contact with the door trim 12.

Here, there is the possibility that the downward suspended attitude described above is changed due to a vibration or the like to consequently bring the flat cable 4 (and the outer covering 3) into contact with the door trim 12. To prevent this, it is preferable that the flat cable 4 (and the outer covering 3) is not likely to deform in the vertical direction. In other words, it is preferable that the flat cable 4 (and the outer covering 3) is not likely to deform in a plane perpendicular to the horizontal plane (for example, in a plane shown in FIG. 2).

In this embodiment, as described above, the vehicle body side attachment 1 and the door side attachment 2 support the outer covering 3 (and the flat cable 4) such that the thickness direction of the flat cable 4 and the outer covering 3 is in parallel with the horizontal plane. Accordingly, at locations near the vehicle body side attachment 1 and the door side attachment 2, the flat cable 4 and the outer covering 3 are not likely to deform in a plane perpendicular to the horizontal plane. This makes it easy to maintain the suspended attitude of the flat cable 4 (and the outer covering 3).

As described above, in the vehicle body side attachment 1 and the door side attachment 2, an innovation concerning the orientation, the inclination angle, and the like, in supporting the flat cable 4 is introduced. Thereby, the deformation of the flat cable 4 can be three-dimensionally controlled without any special guide member or the like. More specifically, the flat cable 4 can, while maintaining the suspended state, follow the sliding of the sliding door 20 and deform in a good manner. Thus, it is not necessary to provide a guide member that restricts the deformation of the cable. Consequently, the downsizing and weight reduction of the power supply apparatus 30 for sliding door are achieved.

Figure 6:
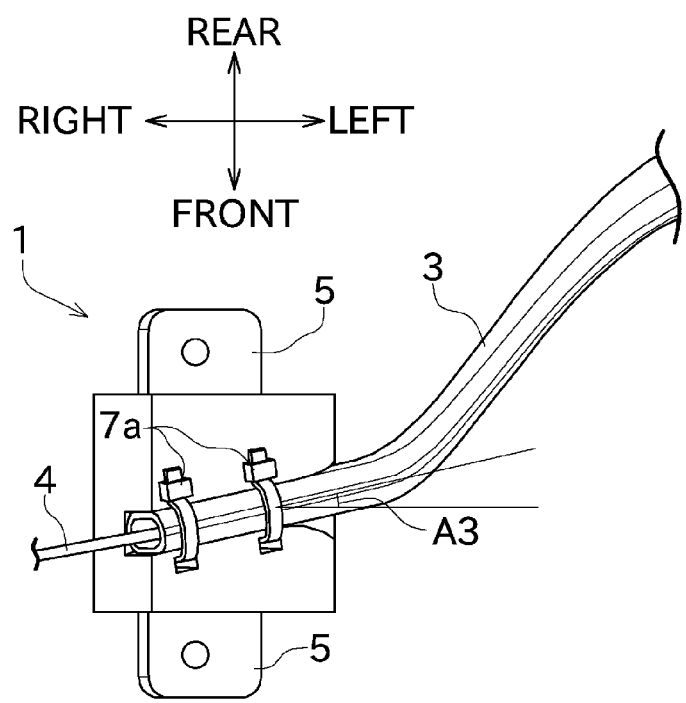
FIG. 6 A plan view of the vehicle body side attachment.

As shown in FIG. 6, the cable mounting groove 7 of the vehicle body side attachment 1 is formed such that, in a plan view, the longitudinal direction of the flat cable 4 (and the outer covering 3) has a predetermined third inclination angle A3 relative to the lateral direction of the vehicle body. This makes the flat cable 4 (and the outer covering 3) extend obliquely rearward out from the vehicle body side attachment 1 and then extend toward the door side attachment 2. Accordingly, the trajectory of the flat cable 4 following the opening/closing of the sliding door 20 can be stabilized. More specifically, there is an effect that a rapid change of the trajectory of the flat cable 4, which may occur when the sliding door 20 is closed, is suppressed.

It is preferable that the above-mentioned first inclination angle A1 is in a range of 0° to 60°, the above-mentioned second inclination angle A2 is in a range of 30° to 90°, and the above-mentioned third inclination angle A3 is in a range of 0° to 60°. Optimum inclination angles within the above-mentioned ranges are set for each vehicle. Thereby, even when the amount of movement of the sliding door is different among vehicles, the trajectory of the flat cable 4 that does not interfere with the door trim 12 is achieved irrespective of the difference in the amount of movement.

In this embodiment, the flat cable 4 (and the outer covering 3) located between the vehicle body side attachment 1 and the door side attachment 2 is routed such that the amount of suspending when the sliding door 20 is half open is greater than the amount of suspending when the sliding door 20 is fully open or fully closed. In other words, the flat cable 4 (and the outer covering 3) located between the vehicle body side attachment 1 and the door side attachment 2 is routed such that the flat cable 4 (and the outer covering 3) is tighter in the fully open state or the fully closed state than in the half open state.

Figure 7:
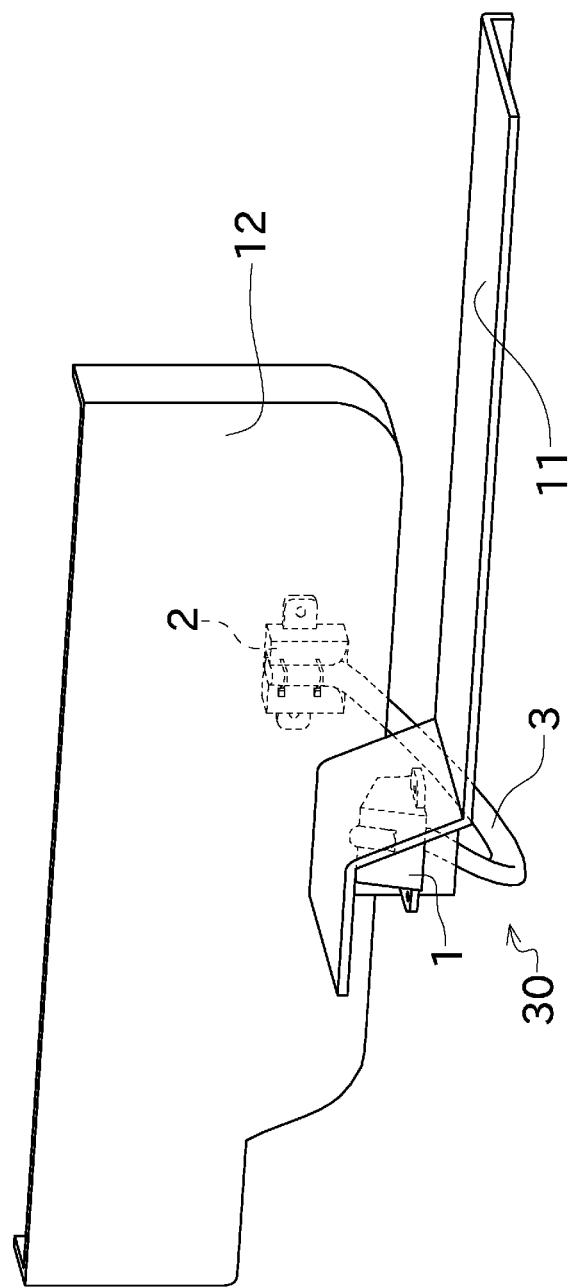
FIG. 7 A perspective view showing a state where a sliding door is half open.
Figure 8:
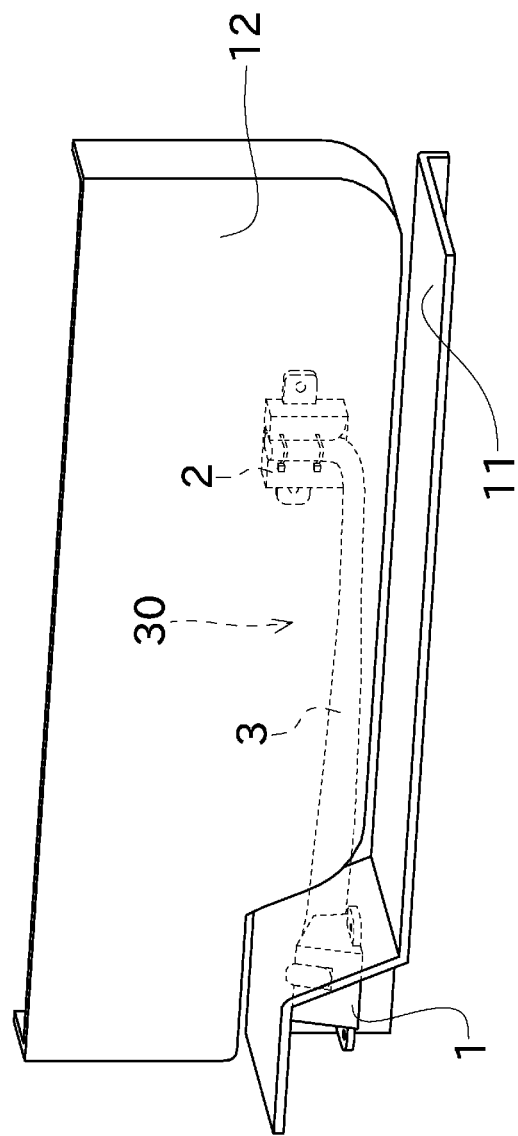
FIG. 8 A perspective view showing a state where the sliding door is fully closed.

That is, as shown in FIG. 8, when the sliding door 20 is fully closed, the outer covering 3 (and the flat cable) located between the vehicle body side attachment 1 and the door side attachment 2 is tighter than when the sliding door 20 is in the course of opening/closing (when the sliding door 20 is half open, in a state shown in FIG. 7). Thus, the outer covering 3 (and the flat cable) is substantially linear. This can cause the outer covering 3 (and the flat cable) to be efficiently covered with the door trim 12, and also can minimize an occupied space inside the door trim 12.

Figure 9:
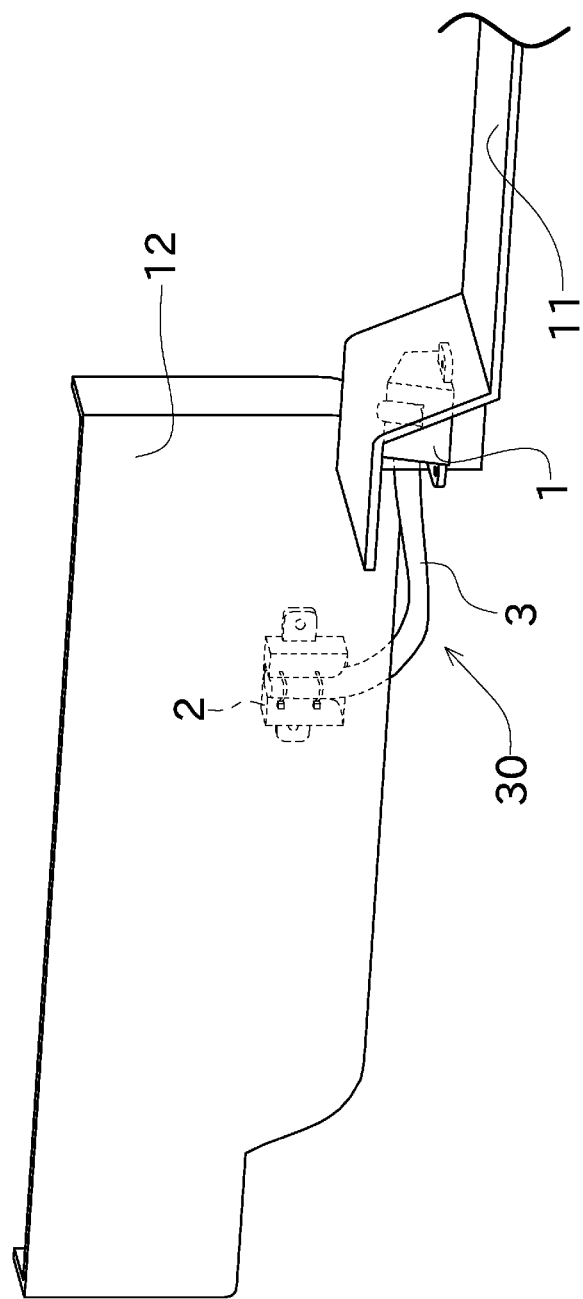
FIG. 9 A perspective view showing a state where the sliding door is fully open.

As shown in FIG. 9, also when the sliding door 20 is fully open, the outer covering 3 (and the flat cable) located between the vehicle body side attachment 1 and the door side attachment 2 is tighter than when the sliding door 20 is in the course of opening/closing (when the sliding door 20 is half open, in the state shown in FIG. 7).

Figure 10:
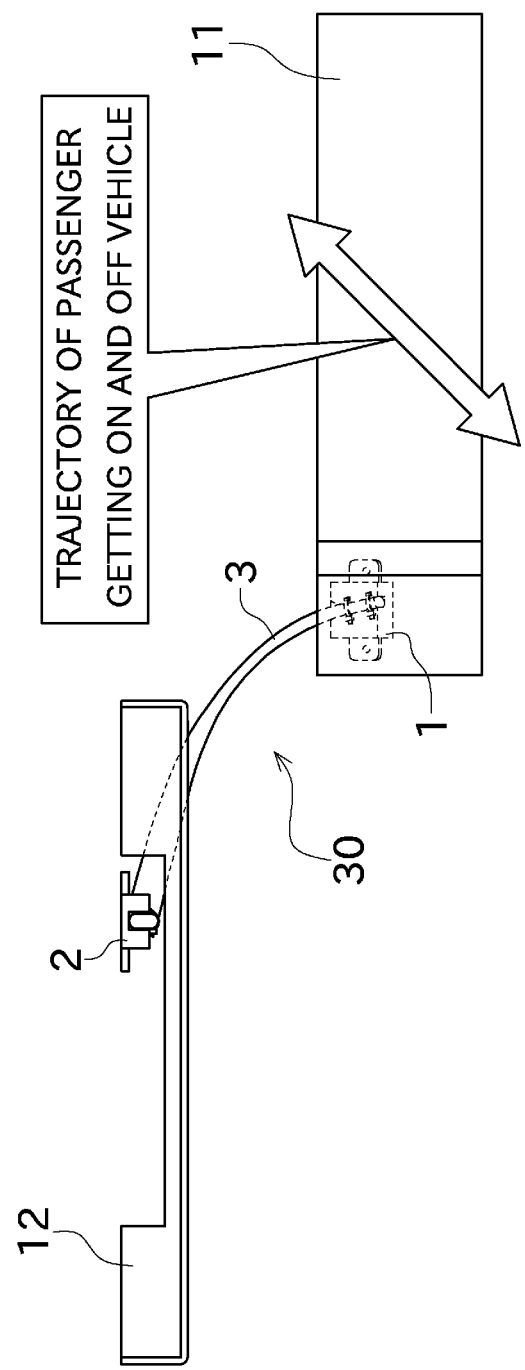
FIG. 10 A plan view showing the state where the sliding door is fully open.

Thus, the outer covering 3 (and the flat cable) is substantially linear. In this manner, the outer covering 3 (and the flat cable) is routed in a substantially linear fashion. Therefore, the trajectory is not largely curved. Accordingly, a space near the feet of the passenger can be ensured when the passenger gets on and off the vehicle. Thus, as shown in FIG. 10, the trajectory of the passenger getting on and off the vehicle is not disturbed by the outer covering 3 (and the flat cable). This reduces a risk that the passenger may stumble when he/she gets on and off the vehicle.

As described above, the power supply apparatus 30 for sliding door according to this embodiment includes the flat cable 4, the vehicle body side attachment 1 that supports the flat cable 4 in the vehicle body 19 side, and the door side attachment 2 that supports the flat cable 4 in the sliding door 20 side. The vehicle body side attachment 1 supports the flat cable 4 such that the longitudinal direction of the flat cable 4 has the predetermined first inclination angle A1 relative to the horizontal plane. The door side attachment 2 supports the flat cable 4 such that the longitudinal direction of the flat cable 4 has the predetermined second inclination angle A2 relative to the horizontal plane.

The vehicle body side attachment 1 and the door side attachment 2 support the flat cable 4 such that the thickness direction of the flat cable 4 is substantially in parallel with the horizontal plane.

That is, since there is an anisotropy in the bendability of the flat cable 4, the flat cable 4 is, when deformed, likely to bend in a predetermined direction. Accordingly, by connecting the vehicle body 19 side and the sliding door 20 side to each other by means of the flat cable 4, the deformation of the flat cable 4 caused when the sliding door 20 slides can be three-dimensionally controlled. As a result, a guide, or the like, for restricting the deformation of the cable, which has been provided in the conventional techniques, can be omitted. Thus, the downsizing and weight reduction of the power supply apparatus for sliding door are achieved.

The power supply apparatus 30 for sliding door according to this embodiment is configured as follows. That is, the first inclination angle A1 and the second inclination angle A2 are determined such that at least a part of the flat cable 4 is suspended vertically downward at a location between the vehicle body side attachment 1 and the door side attachment 2.

This can prevent the flat cable 4 from interfering with the sliding door 20 and the door trim 12 during opening/closing of the sliding door 20.

In the power supply apparatus 30 for sliding door according to this embodiment, the flat cable 4 is routed such that the flat cable 4 is tighter when the sliding door 20 is fully open or fully closed than when the sliding door 20 is half open.

That is, when the sliding door 20 is fully closed, the suspended part of the flat cable 4 is stretched into a substantially linear shape. Therefore, the flat cable 4 can be efficiently covered with the door trim 12. This prevents deterioration in the aesthetic appeal, because the flat cable 4 is not exposed when the sliding door 20 is fully closed.

Also when the sliding door 20 is fully open, the suspended part of the flat cable 4 is stretched into a substantially linear shape. Therefore, the trajectory of the flat cable 4 is not largely curved. This can ensure a space near the feet of the passenger when the passenger gets on and off the vehicle, and thus can reduce a risk that the passenger may stumble.

In the power supply apparatus 30 for sliding door according to this embodiment, it is preferable that the first inclination angle A1 is 0° or more and 60° or less and the second inclination angle A2 is 30° or more and 90° or less.

Setting the first inclination angle A1 and the second inclination angle A2 to values in these ranges can achieve an appropriate suspended attitude of the flat cable 4.

The power supply apparatus 30 for sliding door according to this embodiment is configured as follows. That is, the vehicle body side attachment 1 supports the flat cable 4 such that, in a plan view, the longitudinal direction of the flat cable 4 has the predetermined third inclination angle A3 relative to the lateral direction of the vehicle body 19. The third inclination angle A3 is determined such that the direction in which the flat cable 4 extends out from the vehicle body side attachment 1 is oriented obliquely rearward of the vehicle body 19.

This can suppress a rapid change of the trajectory of the flat cable 4 during opening/closing of the sliding door 20, and can stabilize the trajectory of the flat cable 4.

In the power supply apparatus 30 for sliding door according to this embodiment, it is preferable that the third inclination angle A3 is 0° or more and 60° or less.

Setting the third inclination angle A3 to a value in this range can stabilize the trajectory of the flat cable during opening/closing of the sliding door.

In the power supply apparatus 30 for sliding door according to this embodiment, the flat cable 4 is protected with the outer covering 3 having excellent bending properties.

This can not only protect the flat cable 4 but also improve the aesthetic appeal of the flat cable 4 when the sliding door 20 is half open or fully open.

Although a preferred embodiment of the present invention has been described above, the above-described configuration may be modified, for example, as follows.

In the embodiment described above, the first inclination angle A1 and the second inclination angle A2 are determined such that the flat cable 4 located between the vehicle body side attachment 1 and the door side attachment 2 has a suspended attitude. However, this is not limiting. The essential point of the present invention is in that the anisotropy in the bendability of the flat cable 4 is utilized for controlling the deformation of the flat cable 4. It is not always necessary that the flat cable 4 has a suspended attitude. Appropriately setting the first inclination angle A1 and the second inclination angle A2 can cause the flat cable 4 to be deformed into not only the suspended attitude but also a desired attitude.

The above description states that a guide member for guiding the deformation of the flat cable 4 can be omitted. Here, if needed, a member for guiding the deformation of the flat cable 4 may be arranged as appropriate.

In the described configuration, the outer covering 3 is fixed with the binding bands 7a in the vehicle body side attachment 1 and the door side attachment 2. Instead, it may be also acceptable that the outer covering 3 is pinched between two resin parts and thus fixed.

Figure 11:
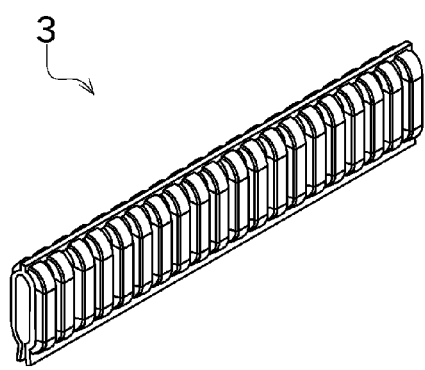
FIG. 11 A perspective view of an outer covering according to a modification.

In the description above, the outer covering 3 is configured of a rubber tube. Alternatively, for example, as shown in FIG. 11, the outer covering 3 may be configured as a corrugated tube, which can structurally ensure bending properties.

The outer covering 3 may be omitted.

DESCRIPTION OF THE REFERENCE NUMERALS 1 vehicle body side attachment
2 door side attachment
3 outer covering
4 flat cable
19 vehicle body
20 sliding door
30 power supply apparatus for sliding door

The invention claimed is:

1. A power supply apparatus for sliding door configured to electrically connect a vehicle body side to a sliding door side, the power supply apparatus for sliding door comprising:
   a flat cable;
   a vehicle body side attachment that secures the flat cable to the vehicle body side; and
   a door side attachment that secures the flat cable to the sliding door side,
   wherein
   the vehicle body side attachment secures the flat cable such that a longitudinal direction of the flat cable has a predetermined first inclination angle relative to a horizontal plane,
   the door side attachment secures the flat cable such that the longitudinal direction of the flat cable has a predetermined second inclination angle relative to the horizontal plane,
   the vehicle body side attachment and the door side attachment secure the flat cable such that a thickness direction of the flat cable is substantially in parallel with the horizontal plane,
   the flat cable extends obliquely downward out from the vehicle body side attachment and toward the door side attachment, and
   the flat cable extends downward out from the door side attachment and toward the vehicle body side attachment.

2. The power supply apparatus for sliding door according to claim 1, wherein
   the first inclination angle and the second inclination angle are determined such that at least a part of the flat cable is suspended vertically downward at a location between the vehicle body side attachment and the door side attachment.

3. The power supply apparatus for sliding door according to claim 1 or 2, wherein
   the flat cable is routed such that the flat cable is tighter when the sliding door is fully open or fully closed than when the sliding door is half open.

4. The power supply apparatus for sliding door according to claim 1 or 2, wherein
   the first inclination angle is 0° or more and 60° or less, and the second inclination angle is 30° or more and 90° or less.

5. The power supply apparatus for sliding door according to claim 1 or 2, wherein
   the vehicle body side attachment secures the flat cable such that, in a plan view, the longitudinal direction of the flat cable has a predetermined third inclination angle relative to a lateral direction of the vehicle body,
   the third inclination angle is determined such that a direction in which the flat cable extends out from the vehicle body side attachment is oriented obliquely rearward of the vehicle body.

6. The power supply apparatus for sliding door according to claim 5, wherein
   the third inclination angle is 0° or more and 60° or less.

7. The power supply apparatus for sliding door according to claim 1 or 2, wherein
   the flat cable is protected with an outer covering having excellent bending properties.

* * * * *